(12) United States Patent
Hung

(10) Patent No.: US 10,932,887 B2
(45) Date of Patent: Mar. 2, 2021

(54) REMOVABLE ORTHODONTIC DEVICE

(71) Applicant: Cheng-Hsiang Hung, New Taipei (TW)

(72) Inventor: Cheng-Hsiang Hung, New Taipei (TW)

(*) Notice: Subject to any disclaimer, the term of this patent is extended or adjusted under 35 U.S.C. 154(b) by 41 days.

(21) Appl. No.: 16/447,870

(22) Filed: Jun. 20, 2019

(65) Prior Publication Data
US 2019/0388190 A1 Dec. 26, 2019

Related U.S. Application Data

(60) Provisional application No. 62/688,048, filed on Jun. 21, 2018, provisional application No. 62/738,187, filed on Sep. 28, 2018.

(51) Int. Cl.
A61C 7/08 (2006.01)

(52) U.S. Cl.
CPC .................... A61C 7/08 (2013.01)

(58) Field of Classification Search
CPC .. A61C 7/08; A61C 7/303; A61C 7/20; A61C 7/10
See application file for complete search history.

(56) References Cited

U.S. PATENT DOCUMENTS

| 3,162,948 | A | * | 12/1964 | Gerber | A61C 7/00 433/7 |
| 3,724,075 | A | * | 4/1973 | Kesling | A61C 7/08 433/6 |
| 4,054,996 | A | * | 10/1977 | Wallshein | A61C 7/00 433/7 |
| 4,202,100 | A | * | 5/1980 | Forster | A61C 7/00 433/22 |
| 4,239,487 | A | * | 12/1980 | Murdock | A61C 7/00 433/7 |
| 4,272,240 | A | * | 6/1981 | Glassman | A61C 7/00 433/18 |
| 4,330,273 | A | * | 5/1982 | Kesling | A61C 7/08 433/5 |
| 4,433,956 | A | * | 2/1984 | Witzig | A61C 7/10 433/7 |
| 4,571,178 | A | * | 2/1986 | Rosenberg | A61C 7/10 433/18 |
| 4,573,914 | A | * | 3/1986 | Nord | A61C 7/10 433/18 |

(Continued)

Primary Examiner — Nicholas D Lucchesi

(57) ABSTRACT

A removable orthodontic device includes an anchorage cap segment, a moving cap segment, a pair of spring elements, and a guiding wire. The anchorage cap segment is removably worn on the anterior teeth of a dental arch. The moving cap segment is removably worn on at least one posterior tooth on one side of the dental arch. The spring elements are disposed between the anchorage and moving cap segments to generate an elastic resilient force to move the moving cap segment relative to the anchorage cap segment. The guiding wire has a U-shaped portion and two rod portions. The U-shaped portion is embedded in and disposed around three sidewalls of the moving cap segment, and the rod portions are received in guiding channels formed in the buccal and lingual sidewalls of the anchorage cap segment to guide the movement of the moving cap segment.

17 Claims, 11 Drawing Sheets

(56) References Cited

U.S. PATENT DOCUMENTS

| | | | | |
|---|---|---|---|---|
| 5,022,855 A * | 6/1991 | Jeckel | A61C 7/00 | 433/18 |
| 5,167,500 A * | 12/1992 | Miura | A61C 7/10 | 433/7 |
| 5,645,422 A * | 7/1997 | Williams | A61C 7/10 | 433/7 |
| 5,769,631 A * | 6/1998 | Williams | A61C 7/10 | 433/7 |
| 5,829,970 A * | 11/1998 | Yousefian | A61C 7/00 | 433/7 |
| 6,425,758 B1 * | 7/2002 | Forster | A61C 7/10 | 433/7 |
| 2003/0194675 A1 * | 10/2003 | Williams | A61C 7/10 | 433/18 |
| 2005/0037312 A1 * | 2/2005 | Uchida | A61C 7/00 | 433/6 |
| 2010/0075269 A1 * | 3/2010 | Mutschler | A61C 7/08 | 433/10 |
| 2013/0157213 A1 * | 6/2013 | Arruda | A61C 7/08 | 433/6 |
| 2014/0178829 A1 * | 6/2014 | Kim | A61C 7/02 | 433/3 |
| 2014/0315139 A1 * | 10/2014 | Piancino | A61C 7/10 | 433/6 |
| 2014/0363779 A1 * | 12/2014 | Kopelman | A61C 7/08 | 433/6 |
| 2015/0079531 A1 * | 3/2015 | Heine | A61C 7/36 | 433/19 |
| 2015/0125802 A1 * | 5/2015 | Tal | A61C 7/12 | 433/6 |
| 2015/0245887 A1 * | 9/2015 | Izugami | A61C 7/36 | 433/6 |
| 2015/0257856 A1 * | 9/2015 | Martz | A61C 7/14 | 433/6 |
| 2016/0081767 A1 * | 3/2016 | Metcalf | A61C 7/10 | 433/6 |
| 2017/0007367 A1 * | 1/2017 | Li | A61C 7/002 | |
| 2017/0056236 A1 * | 3/2017 | Yousefian | A61C 7/10 | |
| 2017/0100215 A1 * | 4/2017 | Khouri | A61C 7/08 | |
| 2017/0135850 A1 * | 5/2017 | Veis | A61C 7/10 | |
| 2017/0258554 A1 * | 9/2017 | Hung | A61C 7/08 | |
| 2019/0046298 A1 * | 2/2019 | Cinader, Jr. | A61C 7/285 | |
| 2019/0151137 A1 * | 5/2019 | Metz | A61F 5/566 | |
| 2019/0175305 A1 * | 6/2019 | Hung | A61C 7/08 | |
| 2019/0201166 A1 * | 7/2019 | Hung | A61C 7/303 | |
| 2019/0231485 A1 * | 8/2019 | Moon | A61C 7/10 | |
| 2020/0022785 A1 * | 1/2020 | Bear | A61F 5/566 | |
| 2020/0038144 A1 * | 2/2020 | Abels | A61C 7/146 | |
| 2020/0155277 A1 * | 5/2020 | Clark | A61C 7/10 | |
| 2020/0281692 A1 * | 9/2020 | Galella | A61C 7/287 | |

* cited by examiner

REMOVABLE ORTHODONTIC DEVICE

CROSS REFERENCE TO RELATED APPLICATIONS

The present application claims the benefit of U.S. Provisional Patent Application No. 62/688,048, filed Jun. 21, 2018, and U.S. Provisional Patent Application No. 62/738,187, filed Sep. 28, 2018, the entirety of which are incorporated by reference herein.

BACKGROUND OF THE INVENTION

Field of the Invention

The present application relates to an orthodontic technology; and in particular to a removable orthodontic device that can correct crowding, spacing and/or rotation problems with improved stability of tooth movement during correction.

Description of the Related Art

Misaligned teeth can adversely affect a person's dental aesthetics, functions, and health. The goal of orthodontic correction is to bring the teeth into proper alignment by using appliances which exert mechanical forces to move the teeth to positions or orientations where the dental functions are improved.

Conventional braces use archwires and brackets to induce force on the teeth. The archwire is pre-shaped and interconnects the teeth through brackets that are fixed to the surfaces of the teeth. When initially installed, the archwire elastically deforms to accommodate the misaligned teeth. The archwire is resilient and exerts forces on the teeth through the brackets to bring the teeth into alignment with the pre-shaped form of the archwire. The archwire exerts continuous forces on the teeth to urge them to their desired positions.

Compared to fixed orthodontic braces, removable appliances are an improvement in terms of being less visible and easier to maintain oral hygiene. Making use of the appliance's own resilient property is also the working principle with clear aligners. The body or shell of clear aligners used in prior art is flexible and deforms when the appliance is worn, providing resilient corrective force as it tries to return to its original shape.

Although existing removable orthodontic devices have been adequate for their intended purposes, such as for correcting crowding, spacing and/or rotation problems, they have not been entirely satisfactory in all respects.

BRIEF SUMMARY OF THE INVENTION

According to some embodiments of the invention, a removable orthodontic device is provided, including an anchorage cap segment, a moving cap segment, a pair of spring elements, and a guiding wire. The anchorage cap segment is configured to be removably worn on anterior teeth of a dental arch of a patient. The moving cap segment is configured to be removably worn at least one posterior tooth on a side of the dental arch. The pair of spring elements is disposed between the anchorage cap segment and the moving cap segment on the buccal and lingual sides of the said side of the dental arch to generate an elastic resilient force to move the moving cap segment relative to the anchorage cap segment. The guiding wire has a U-shaped portion and two rod portions extending from both ends of the U-shaped portion. The U-shaped portion is embedded in and disposed around the buccal, lingual and distal sidewalls of the moving cap segment, and guiding channels are formed in the buccal and lingual sidewalls of the anchorage cap segment for receiving the two rod portions to guide the movement of the moving cap segment.

In some embodiments, each of the guiding channels extends mesial-distally.

In some embodiments, each of the buccal, lingual and distal sidewalls of the moving cap segment has a thickness to accommodate the U-shaped portion of the guiding wire, and each of the buccal and lingual sidewalls of the anchorage cap segment has a thickness to accommodate a tubular guiding channel for receiving one of the two rod portions of the guiding wire.

In some embodiments, each of the pair of spring elements is wrapped around the guiding wire.

In some embodiments, each of the pair of spring elements is a compression coil spring.

In some embodiments, each of the pair of spring elements is an extension coil spring.

In some embodiments, a vertical height difference is formed between the guiding wire coupled to the anchorage cap segment and the guiding wire coupled to the moving cap segment.

According to some embodiments of the invention, a removable orthodontic device is also provided, including an anchorage cap segment, a moving cap segment, a pair of spring elements, and a guiding wire. The anchorage cap segment is configured to be removably worn on posterior teeth on a side of a dental arch of a patient. The moving cap segment is configured to be removably worn on at least one anterior tooth on the same side of the dental arch. The pair of spring elements is disposed between the anchorage cap segment and the moving cap segment on the buccal and lingual sides of the said side of the dental arch to generate an elastic resilient force to move the moving cap segment relative to the anchorage cap segment. The guiding wire has a U-shaped portion and two rod portions extending from both ends of the U-shaped portion. The U-shaped portion is embedded in and disposed around the buccal, lingual and mesial sidewalls of the moving cap segment, and the two rod portions are movably received in guiding channels formed in the buccal and lingual sidewalls of the anchorage cap segment to guide the movement of the moving cap segment.

In some embodiments, each of the buccal, lingual and mesial sidewalls of the moving cap segment has a thickness to accommodate the U-shaped portion of the guiding wire, and each of the buccal and lingual sidewalls of the anchorage cap segment has a thickness to accommodate a tubular guiding channel for receiving one of the two rod portions of the guiding wire.

In some embodiments, each of the pair of spring elements is directly connected to the anchorage cap segment and the moving cap segment without coupling to the guiding wire.

In some embodiments, the removable orthodontic device further includes a plurality of anchorage cap segments, a plurality of moving cap segments, multiple pairs of spring elements, and a plurality of guiding wires. The anchorage cap segments are configured to be removably worn on posterior teeth on two sides of the dental arch, respectively. The moving cap segments are configured to be removably worn on at least one anterior tooth on the two sides of the dental arch, respectively. Each pair of spring elements is disposed between the anchorage cap segment and the moving cap segment on the buccal and lingual sides of one side of the dental arch to generate an elastic resilient force to move the moving cap segment relative to the anchorage cap segment. The guiding wires each has a U-shaped portion and two rod portions extending from both ends of the U-shaped portion. The U-shaped portion is embedded in and disposed around the buccal, lingual and mesial sidewalls of the moving cap segment, and guiding channels are formed in the buccal and lingual sidewalls of the anchorage cap segment for receiving the two rod portions to guide the movement of the moving cap segment.

In some embodiments, the removable orthodontic device further includes a transverse bar connecting the anchorage cap segments and having a shape conforming to the palate or the floor of the mouth of the patient.

In some embodiments, the anchorage cap segment further has a vertical extension part extended from the buccal wall of the anchorage cap segment and a first connector formed on the vertical extension part. The moving cap segment further has a second connector formed on the buccal sidewall of the moving cap segment. The removable orthodontic device further includes an elastic member coupling the second connector to the first connector to exert an elastic traction force having horizontal and vertical components on the moving cap segment.

According to some embodiments of the invention, a removable orthodontic device is also provided, including an anchorage cap segment, a moving cap segment, and a wire structure. The anchorage cap segment is configured to be removably worn on a plurality of first teeth on a side of a dental arch of a patient. The moving cap segment is configured to be removably worn on a second tooth on the same side of the dental arch. The wire structure has a U-shaped portion, two rod portions, and two loop spring portions disposed between both ends of the U-shaped portion and the two rod portions. The U-shaped portion is embedded in and disposed around the buccal sidewall, lingual sidewall, and an interproximal sidewall between the buccal and lingual sidewalls of the moving cap segment. The two rod portions are embedded in the buccal and lingual sidewalls of the anchorage cap segment. The two loop spring portions are configured between the moving cap segment and the anchorage cap segment to generate an elastic resilient force to move the moving cap segment relative to the anchorage cap segment.

In some embodiments, each of the buccal, lingual and interproximal sidewalls of the moving cap segment has a thickness to accommodate the U-shaped portion of the wire structure, and each of the buccal and lingual sidewalls of the anchorage cap segment has a thickness to accommodate one of the two rod portions of the wire structure.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
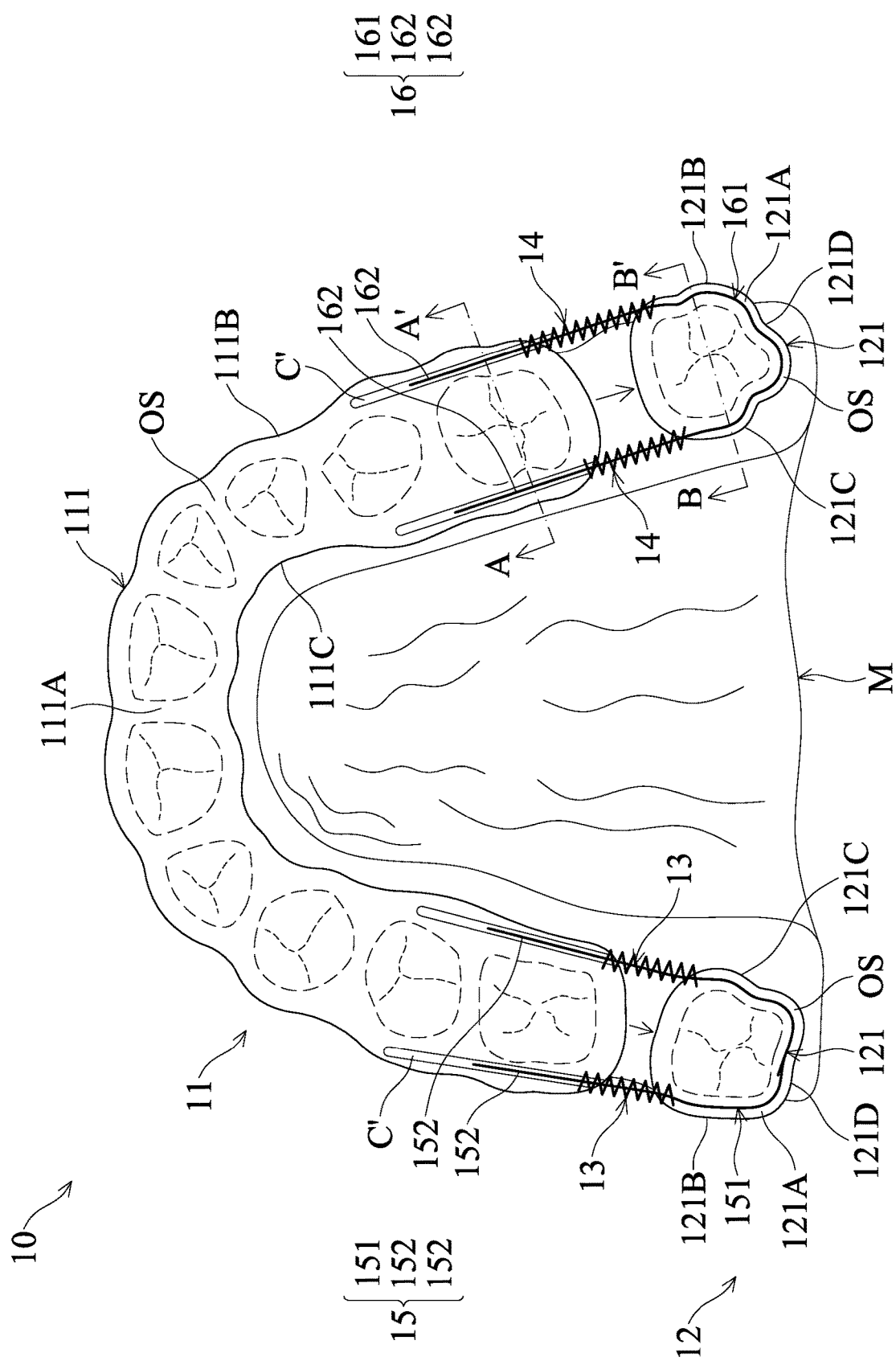
FIG. 1 is a schematic view showing a removable orthodontic device in accordance with some embodiments being worn on a dental arch of a patient, when viewed from the occlusal surface of the device.

In order to illustrate the purposes, features, and advantages of the invention, the preferred embodiments and drawings of the invention are shown in detail as follows.

In the following detailed description, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

The present disclosure provides example embodiments relating to removable orthodontic devices capable of correcting various dental problems, such as crowding, spacing and/or rotation problems with improved stability of tooth movement during correction. Some variations of the embodiments are described. Throughout the various views and illustrative embodiments, common elements use the same reference number.

Figure 2:
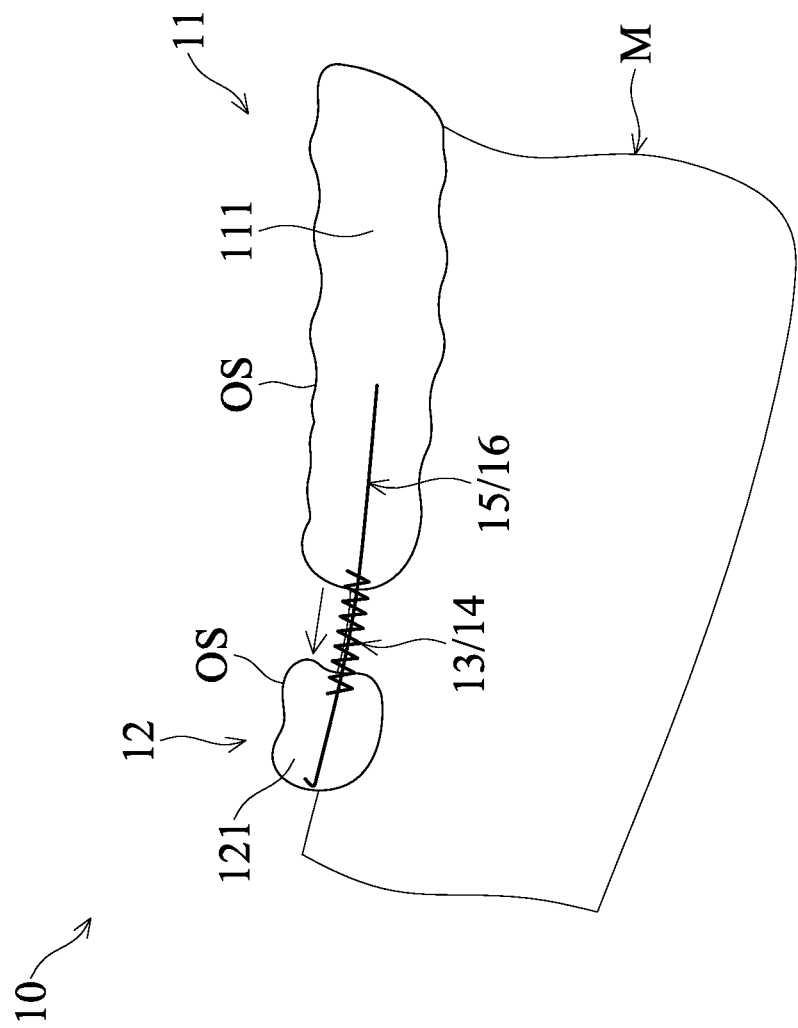
FIG. 2 is a schematic side view of the removable orthodontic device in FIG. 1.

FIG. 1 is a schematic view showing a removable orthodontic device 10 in accordance with some embodiments being worn on a dental arch of a patient, when viewed from the occlusal surface of the device. FIG. 2 is a schematic side view of the removable orthodontic device 10 in FIG. 1. In some embodiments, as shown in FIGS. 1 and 2, the removable orthodontic device 10 includes a first tooth cap unit 11 and a second tooth cap unit 12. The second tooth cap unit 12 is configured to be removably worn on several posterior teeth (e.g., the first molars, depicted by dashed lines) of a dental arch M that are to be moved distally (i.e., backwards). The first tooth cap unit 11 is configured to be removably worn on several anterior teeth (e.g., the incisors, lateral incisors, canines, and first and second premolars, depicted by dashed lines) of the same dental arch M and act as an anchorage for several spring elements to exert elastic correction forces on the posterior teeth engaged to the second tooth cap unit 12 (which will be illustrated further later).

Before the removable orthodontic device 10 is worn, the second molars are extracted so as to create a space for distalization of the posterior teeth.

Figure 3:
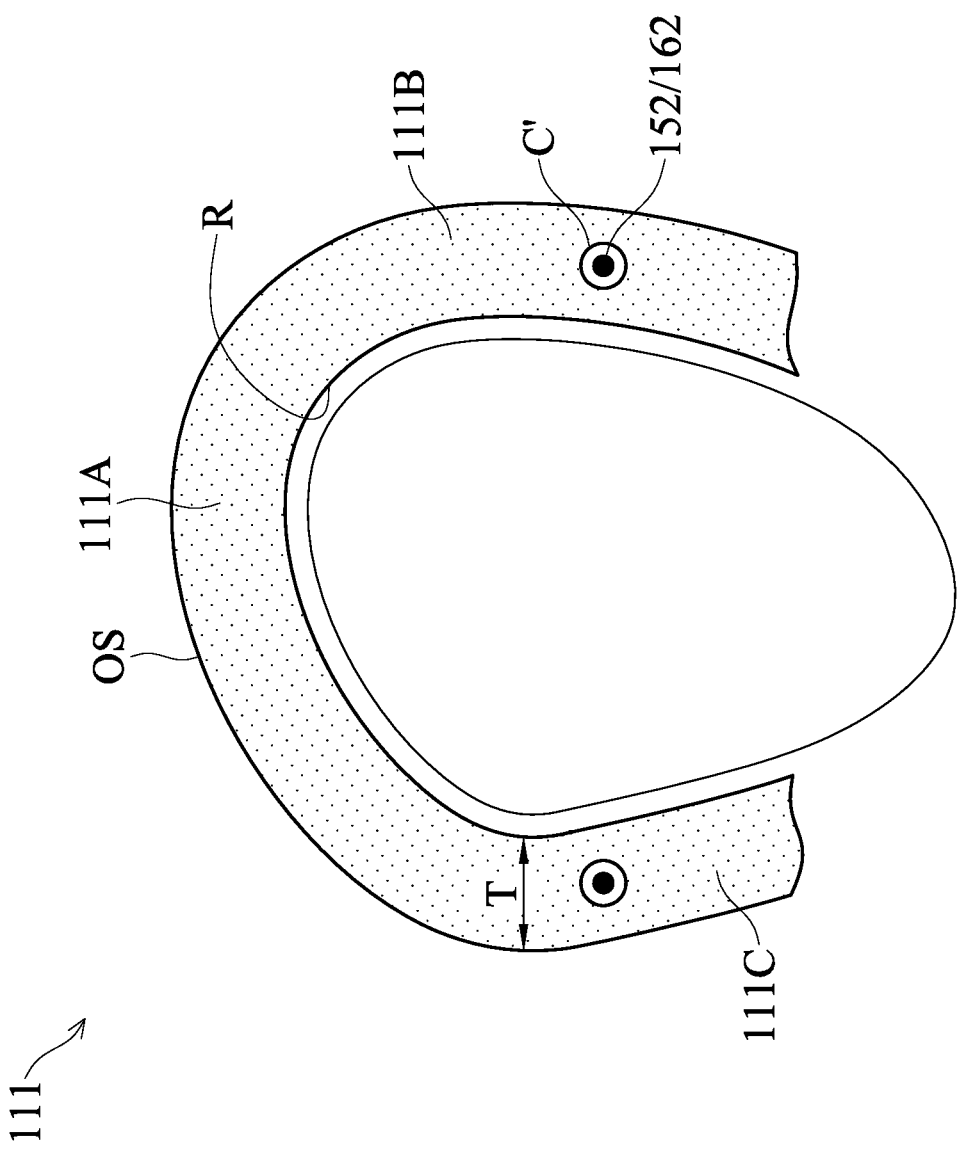
FIG. 3 is a cross-sectional view taken along the line A-A' in FIG. 1.
Figure 4:
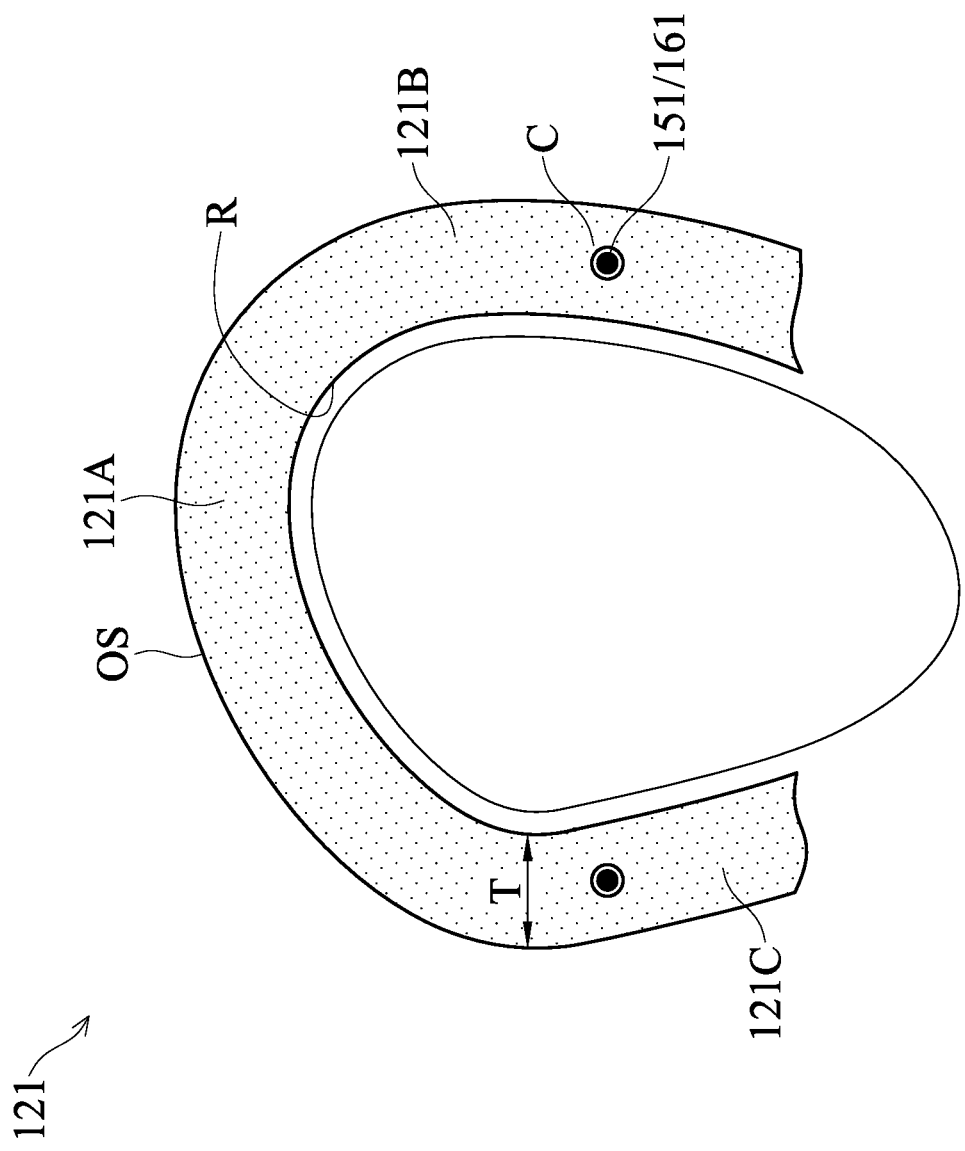
FIG. 4 is a cross-sectional view taken along the line B-B' in FIG. 1.

As shown in FIG. 1, the first tooth cap unit 11 includes an anchorage cap segment 111 that is shaped to enclose and cover the anterior teeth. The structure of anchorage cap segment 111 mainly includes a base wall 111A and two opposite sidewalls 111B, 111C extending from the base wall 111A to form several tooth receiving cavities R (see also FIG. 3) on the inner surface of the anchorage cap segment 111 for receiving the anterior teeth. The anchorage cap segment 111 also includes an occlusal surface OS (see FIGS. 1 to 3) formed on the outer surface and opposite the inner tooth receiving cavities R. As shown in FIG. 1, the second tooth cap unit 12 includes two moving cap segments 121 each is shaped to enclose and cover the posterior tooth on the left or right side of the dental arch M (hereinafter, also called the left or right posterior tooth). Similarly, the structure of the moving cap segment 121 mainly includes a base wall 121A and two opposite sidewalls 121B, 121C extending from the base wall 121A to form a tooth receiving cavity R (see also FIG. 4) on the inner surface of the moving cap segment 121 for receiving the left or right posterior tooth. The moving cap segment 121 also includes an occlusal surface OS (see FIGS. 1, 2 and 4) formed on the outer surface and opposite the inner tooth receiving cavity R.

In some embodiments, each of the anchorage cap segment 111 and moving cap segments 121 is a rigid shell that does not deform or exert a resilient corrective force on the tooth or teeth when worn. In some embodiments, the anchorage cap segment 111 and moving cap segment 121 can be made of orthodontic resin or other materials suitable for use in oral applications well known in the art.

As shown in FIG. 1, the removable orthodontic device 10 further includes a pair of spring elements 13, 13 disposed between the anchorage cap segment 111 and the moving cap segment 121 worn on the left posterior tooth on the buccal and lingual sides of the left side of the dental arch M. Also, the removable orthodontic device 10 further includes another pair of spring elements 14, 14 disposed between the anchorage cap segment 111 and the moving cap segment 121 worn on the right posterior tooth on the buccal and lingual sides of the right side of the dental arch M. One end of each spring element 13/14 can be coupled to (e.g., embedded in) the anchorage cap segment 111, and the other end can be coupled to (e.g., embedded in) the respective moving cap segment 121. In this example, each spring element 13/14 is a compression coil spring. Accordingly, the spring elements 13 and 14 generate an elastic resilient force to move or push the moving cap segments 121 in a direction away from the anchorage cap segment 111 (as indicated by the arrows in FIGS. 1 and 2) when they try to return to their original un-deformed shapes, so as to achieve distalization of the posterior teeth.

As shown in FIG. 1, the removable orthodontic device 10 further includes a guiding wire 15 for guiding movement of the moving cap segment 121 worn on the left posterior tooth relative to the anchorage cap segment 111, and another guiding wire 16 for guiding movement of the moving cap segment 121 worn on the right posterior tooth relative to the anchorage cap segment 111. Each guiding wire 15/16 can be made of metal or shape memory alloys (SMA) and may have a U-shaped portion 151/161 and two rod portions 152, 152/162, 162 extending from both ends of the U-shaped portion 151/161.

As shown in FIG. 1, the U-shaped portion 151/161 can be embedded in and disposed around the buccal sidewall 121B, lingual sidewall 121C, and distal sidewall 121D (connected between the buccal and lingual sidewalls 121B and 121C and located near the rear side of the dental arch M) of the moving cap segment 121. More specifically, the sidewalls of the moving cap segment 121 each has a thickness T to accommodate a tubular channel C for receiving the U-shaped portion 151/161 of the guiding wire 15/16 (see FIG. 4). In this example, the moving cap segment 121 forms a continuous inner tubular channel C passing through the buccal sidewall 121B, lingual sidewall 121C, and distal sidewall 121D. Moreover, the sectional size (i.e., diameter) of the tubular channel C matches the sectional size (i.e., diameter) of the guiding wire 15/16 so that the U-shaped portion 151/161 is fixedly embedded in the moving cap segment 121. In other embodiments, the U-shaped portion 151/161 of the guiding wire 15/16 can be integrally formed in the sidewalls of the moving cap segment 121.

As shown in FIG. 1, the two rod portions 152, 152/162, 162 can be movably received in the guiding channels C' formed in the buccal and lingual sidewalls 111B and 111C of the anchorage cap segment 111. More specifically, the sidewalls of the anchorage cap segment 111 each has a thickness T to accommodate a tubular guiding channel C' for receiving one of the two rod portions 152, 152/162, 162 of the guiding wire 15/16 (see FIG. 3). Moreover, the sectional size (i.e., diameter) of the tubular guiding channel C' is slightly greater than the sectional size (i.e., diameter) of the guiding wire 15/16 to allow the rod portion 152/162 to move in the tubular guiding channel C' (extending mesial-distally) when the moving cap segments 121 are moved or pushed by the spring elements 13 and 14. In some embodiments, each spring element 13/14 is wrapped around the guiding wire 15/16, as shown in FIGS. 1 and 2.

With the above configurations, the guiding wires 15 and 16 provide the stability and guidance during movement of the moving cap segments 121, thereby improving the stability of tooth movement during correction. In particular, the anchorage cap segment 111 engaging with several of the teeth contacts the teeth over a greater surface area to provide a strong anchorage. Together with the guiding wires 15/16 forming a strong bonding with the moving cap segments 121 on three sidewalls, the guiding channels C' act on the guiding wires 15/16 to provide better control over the movement of the posterior teeth.

Figure 5:
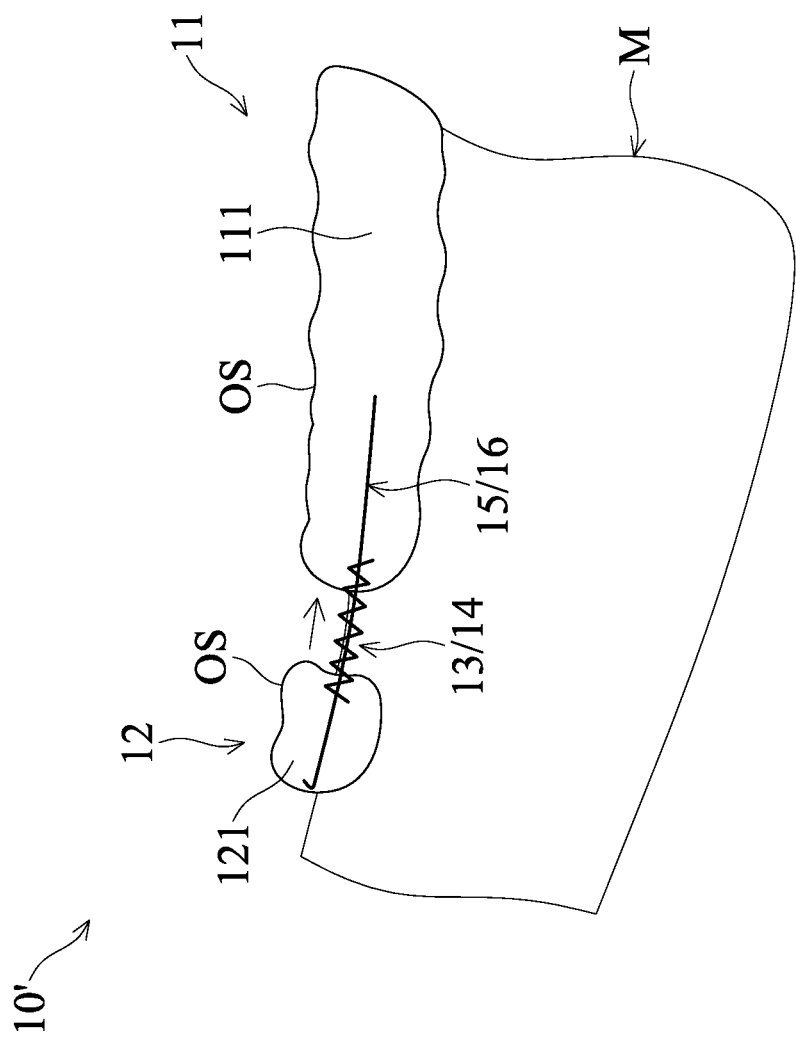
FIG. 5 is a schematic side view of a removable orthodontic device in accordance with some embodiments.

FIG. 5 is a schematic side view of another removable orthodontic device 10' in accordance with some embodiments, wherein each spring element 13/14 utilizes an extension coil spring instead of a compression coil spring. In this example (for closing the space between the anterior teeth and posterior teeth), the spring elements 13 and 14 generate an elastic resilient force to move or pull the moving cap segments 121 in a direction toward the anchorage cap segment 111 (as indicated by the arrow in FIG. 5) when they try to return to their original un-deformed shapes. The guiding wires 15 and 16 of the removable orthodontic device 10' may have similar configurations to the removable orthodontic device 10 described above, thus providing the stability and guidance during movement of the moving cap segments 121 and the teeth therein.

Figure 6:
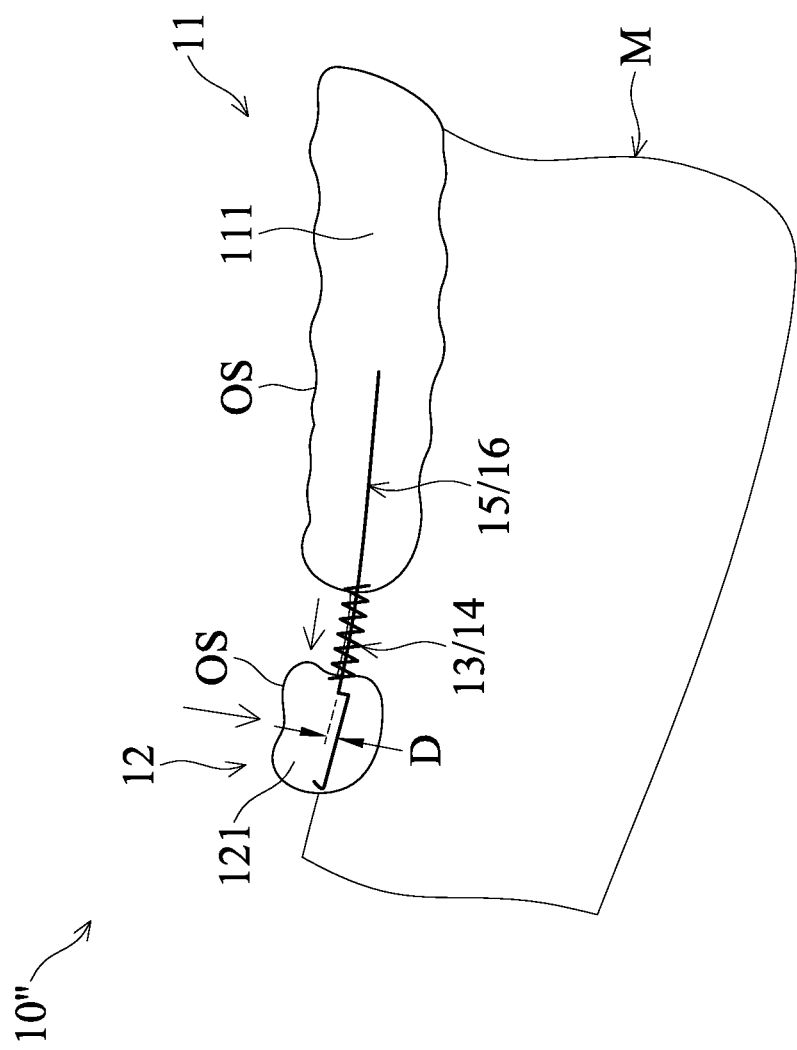
FIG. 6 is a schematic side view of a removable orthodontic device in accordance with some embodiments.

FIG. 6 is a schematic side view of another removable orthodontic device 10" in accordance with some embodiments, wherein a vertical height difference D is formed between the guiding wire 15/16 coupled to the anchorage cap segment 111 and the guiding wire 15/16 coupled to the moving cap segment 121. In this example, the removable orthodontic device 10" not only drives the moving cap segments 121 and the teeth therein to move in a horizontal direction (for example, away from or toward the anchorage cap segment 111) in a manner similar to the removable orthodontic device 10 or 10', but also generates a vertical force by the guiding wire 15/16 having a vertical step to achieve intrusion (as indicated by the arrow in FIG. 6) of the teeth inside the moving cap segments 121 (i.e., to correct the over-erupted posterior teeth).

Figure 7:
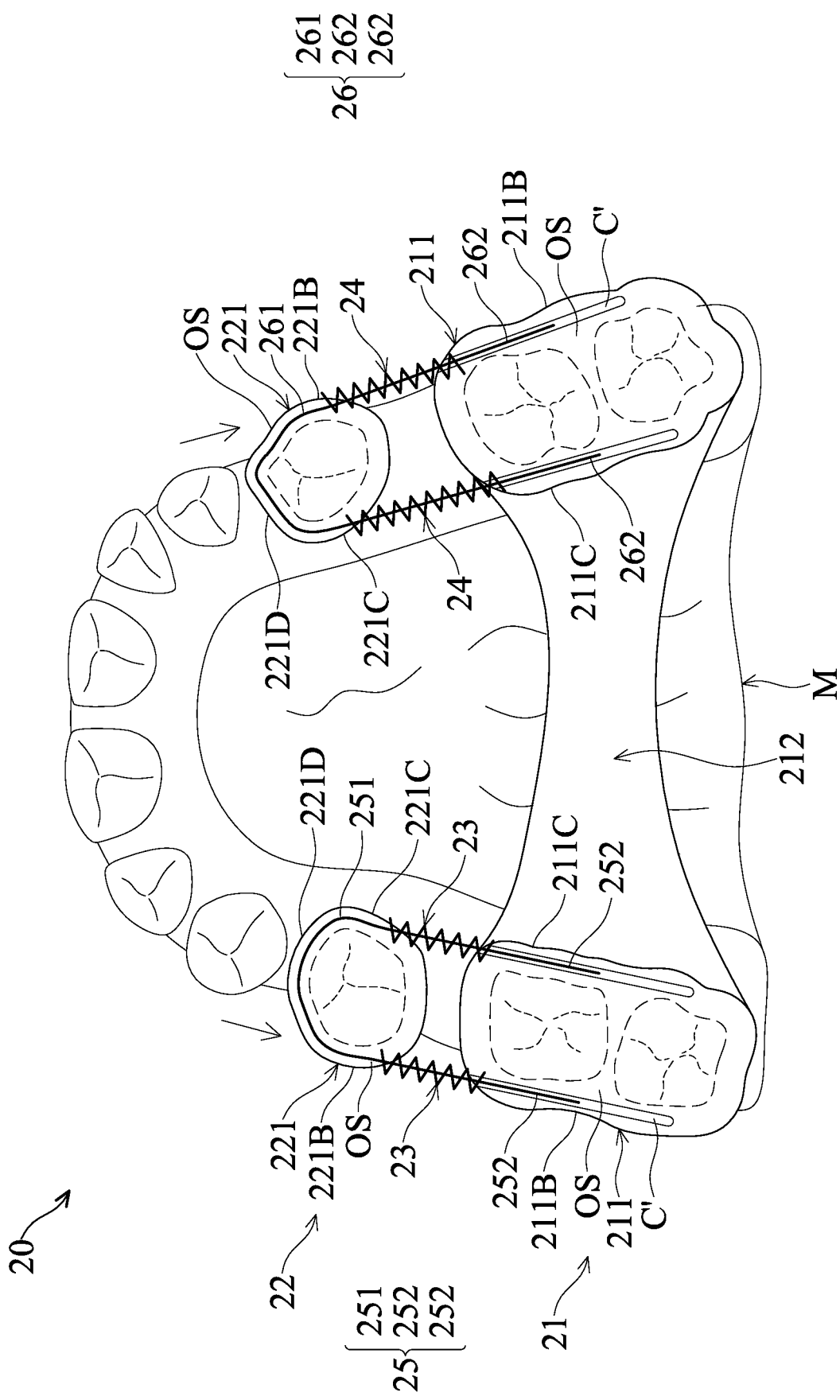
FIG. 7 is a schematic view showing a removable orthodontic device in accordance with some embodiments being worn on a dental arch of a patient, when viewed from the occlusal surface of the device.
Figure 8:
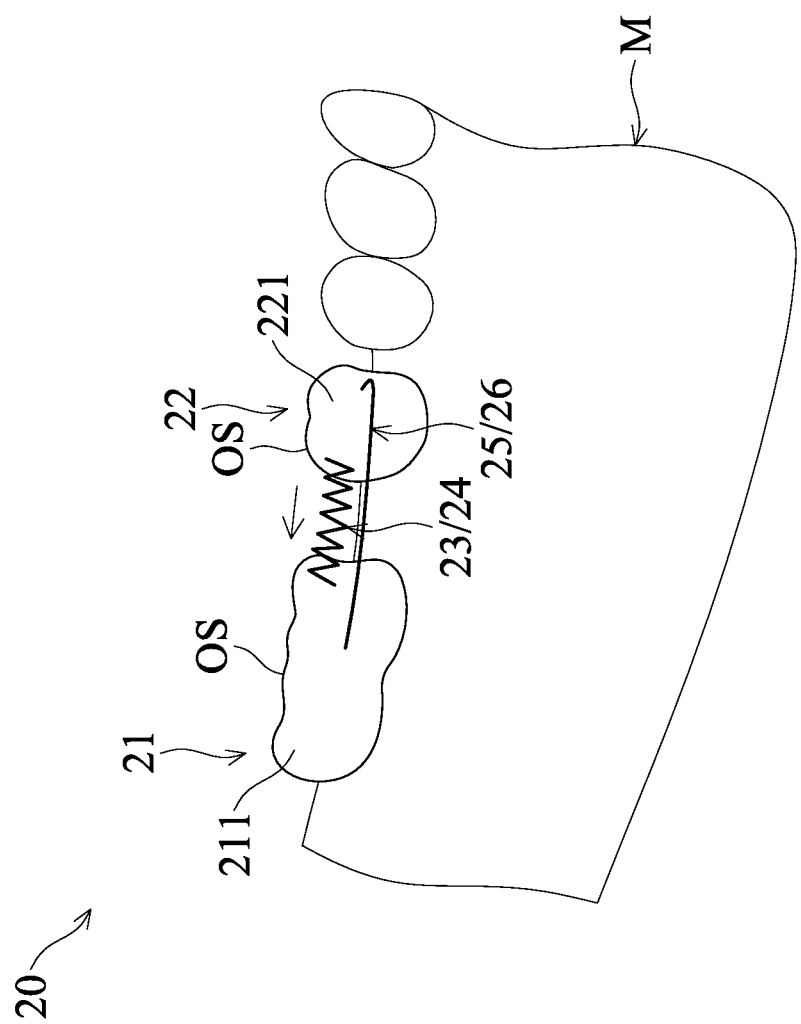
FIG. 8 is a schematic side view of the removable orthodontic device in FIG. 7.

FIG. 7 is a schematic view showing another removable orthodontic device 20 in accordance with some embodiments being worn on a dental arch of a patient, when viewed from the occlusal surface of the device. FIG. 8 is a schematic side view of the removable orthodontic device 20 in FIG. 7. In some embodiments, as shown in FIGS. 7 and 8, the removable orthodontic device 20 includes a first tooth cap unit 21 and a second tooth cap unit 22. The second tooth cap unit 22 is configured to be removably worn on several anterior teeth (e.g., the first premolars, depicted by dashed lines) of a dental arch M that are to be retracted (i.e., backwards). The first tooth cap unit 21 is configured to be removably worn on several posterior teeth (e.g., the first and second molars, depicted by dashed lines) of the same dental arch M and act as an anchorage for several spring elements to exert elastic correction forces on the anterior teeth engaged to the second tooth cap unit 22 (which will be illustrated further later). Before the removable orthodontic device 20 is worn, the second premolars are extracted so as to create a space for retraction of the anterior teeth. In this example, the removable orthodontic device 20 is not worn on the incisors, lateral incisors and canines of the dental arch M.

As shown in FIG. 7, the first tooth cap unit 21 includes two anchorage cap segments 211 each shaped to enclose and cover the posterior teeth on the left or right side of the dental arch M (hereinafter, also called the left or right posterior teeth), and the second tooth cap unit 22 includes two moving cap segments 221 each shaped to enclose and cover the anterior tooth on the left or right side of the dental arch M (hereinafter, also called the left or right anterior tooth). The structures and materials of the anchorage cap segments 211 and moving cap segments 221 may be similar to those of the anchorage cap segment 111 and moving cap segments 121 described above, and thus are not repeated herein.

As shown in FIG. 7, the removable orthodontic device 20 further includes a pair of spring elements 23, 23 disposed between the anchorage cap segment 211 worn on the left posterior teeth and the moving cap segment 221 worn on the left anterior tooth on the buccal and lingual sides of the left side of the dental arch M. Also, the removable orthodontic device 20 further includes another pair of spring elements 24, 24 disposed between the anchorage cap segment 211 worn on the right posterior teeth and the moving cap segment 221 worn on the right anterior tooth on the buccal and lingual sides of the right side of the dental arch M. One end of each spring element 23/24 can be coupled to (e.g., embedded in) the respective anchorage cap segment 211, and the other end can be coupled to (e.g., embedded in) the respective moving cap segment 221. In this example, each spring element 23/24 is an extension coil spring, and can be directly connected the anchorage cap segment 211 and the moving cap segment 221 without coupling to a guiding wire 25/26 (see FIG. 8). Accordingly, the spring elements 23 and 24 generate an elastic resilient force to move or pull the moving cap segments 221 in a direction toward the anchorage cap segments 211 (as indicated by the arrows in FIGS. 7 and 8) when they try to return to their original un-deformed shapes, so as to achieve retraction of the anterior teeth (i.e., to close the space between the anterior teeth and posterior teeth).

It should be appreciated that each spring element 23/24 may also utilize a compression coil spring instead of an extension coil spring in some other embodiments, so as to generate an elastic resilient force to move or push the moving cap segments 221 in a direction away from the anchorage cap segments 211 (for example, in the cases where it is needed to increase the space between the anterior teeth and posterior teeth).

As shown in FIG. 7, the removable orthodontic device 20 further includes a guiding wire 25 for guiding movement of the moving cap segment 221 worn on the left anterior tooth relative to the anchorage cap segment 211 worn on the left posterior teeth, and another guiding wire 26 for guiding movement of the moving cap segment 221 worn on the right anterior tooth relative to the anchorage cap segment 211 worn on the right posterior teeth. Each guiding wire 25/26 can be made of metal or shape memory alloys (SMA) and may have a U-shaped portion 251/261 and two rod portions 252, 252/262, 262 extending from both ends of the U-shaped portion 251/261.

As shown in FIG. 7, the U-shaped portion 251/261 can be fixedly embedded in and disposed around the buccal sidewall 221B, lingual sidewall 221C, and mesial sidewall 221D (connected between the buccal and lingual sidewalls 221B and 221C and located near the front side of the dental arch M) of the moving cap segment 221. The manner in which the U-shaped portion 251/261 is integrated with the moving cap segment 221 is similar to that of the moving cap segment 121 described above, and thus is not repeated herein. Moreover, the two rod portions 252, 252/262, 262 can be movably received in the guiding channels C' formed in the buccal and lingual sidewalls 211B and 211C of the two anchorage cap segments 211, respectively. The configuration (such as the tubular guiding channels formed in the sidewalls) of anchorage cap segment 211 for receiving the two rod portions 252, 252/262, 262 is similar to that of the anchorage cap segment 111 described above (see FIG. 3), and thus is not repeated herein. With the above configurations, the guiding wires 25 and 26 provide the stability and guidance during movement of the moving cap segments 221, thereby improving the stability of tooth movement during correction.

In some embodiments, the first tooth cap unit 21 further includes a transverse bar 212 connecting the anchorage cap segments 211 and having a shape conforming to the palate or the floor (not shown) of the mouth of the patient. Therefore, the stability and retention of the first tooth cap unit 21 when worn is improved.

Figure 9:
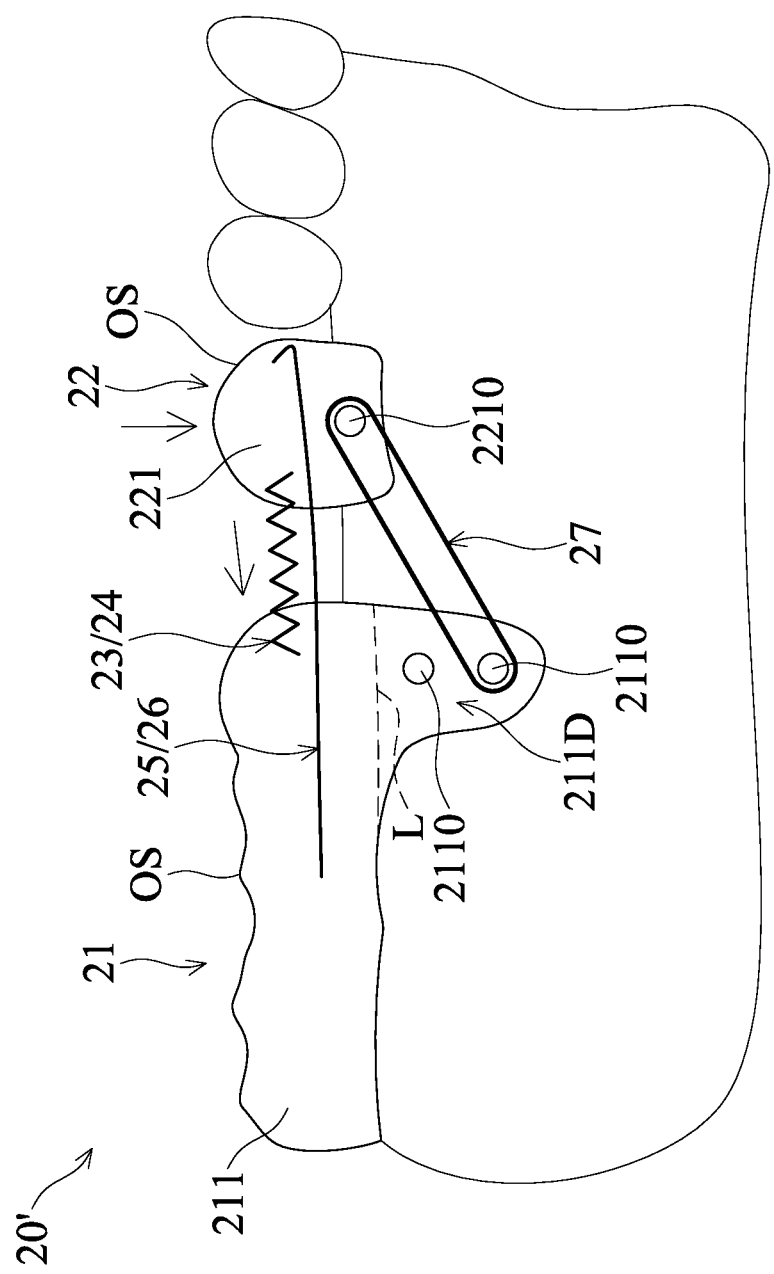
FIG. 9 is a schematic side view of a removable orthodontic device in accordance with some embodiments.

FIG. 9 is a schematic side view of another removable orthodontic device 20' in accordance with some embodiments. Compared to the removable orthodontic device 20, each anchorage cap segment 211 of the removable orthodontic device 20' further has a vertical extension part 211D (for example, the part of the anchorage cap segment 211 below the dashed line depicted in FIG. 9) extended from its buccal sidewall with at least one connector 2110 (e.g., a hook or a button) formed on the vertical extension part 211D, and each moving cap segment 221 further has a connector 2210 formed on its buccal sidewall. Moreover, the removable orthodontic device 20' further includes a plurality of elastic members 27 (e.g., elastic threads or rubber bands) coupling the connectors 2110 on the first tooth cap unit 21 to the connectors 2210 on the second tooth cap unit 22. Since the connector 2110 and the connector 2210 have a vertical height difference therebetween (as shown in FIG. 9), the elastic members 27 can exert an elastic traction force having horizontal and vertical components (as indicated by the horizontal and vertical arrows in FIG. 9) on the moving cap segments 221 to pull the moving cap segments 221 with the anterior teeth in the horizontal and vertical (or apical) directions. As a result, the bowing effect (i.e., the moving anterior teeth tend to tip distally) occurring during the process of retraction is prevented.

Figure 10:
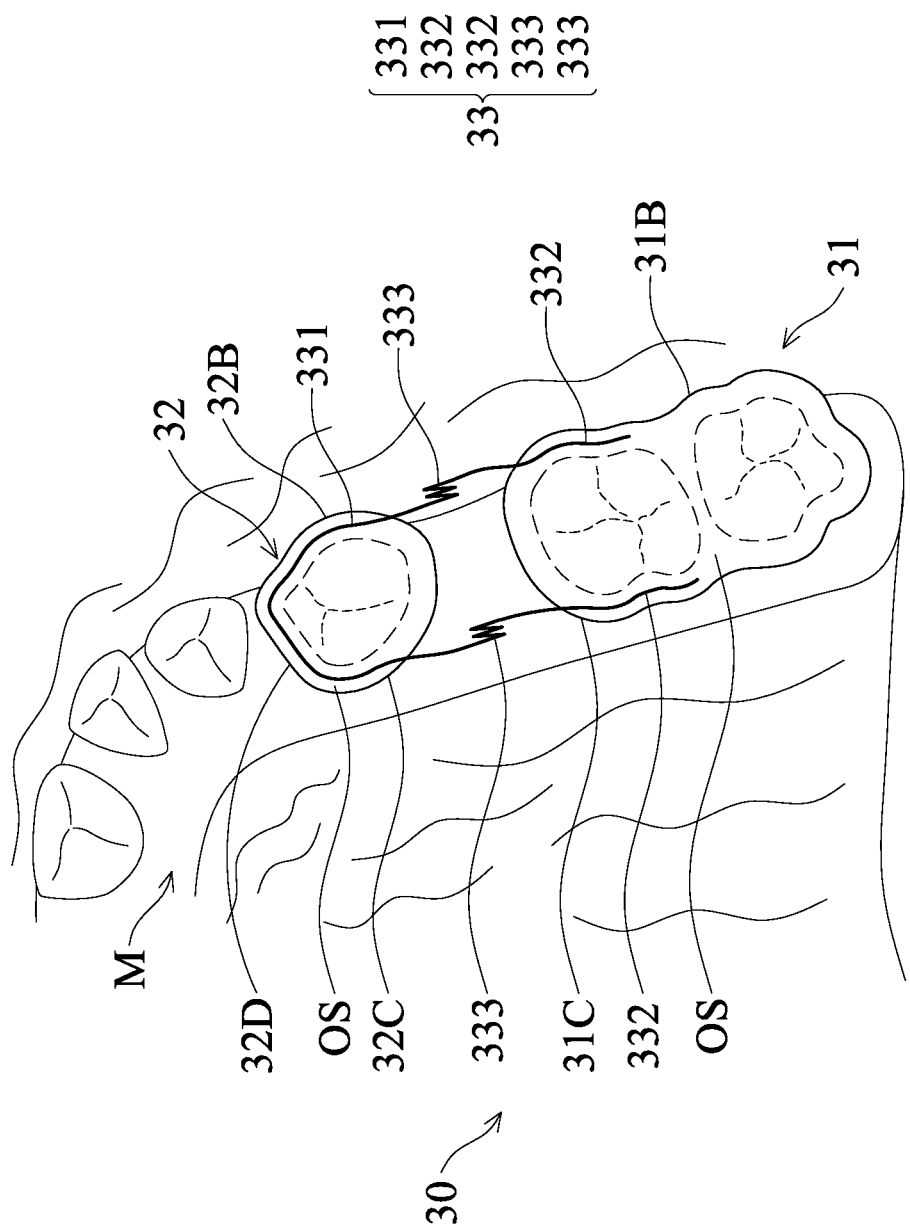
FIG. 10 is a schematic view showing a removable orthodontic device in accordance with some embodiments being worn on a dental arch of a patient, when viewed from the occlusal surface of the device.
Figure 11:
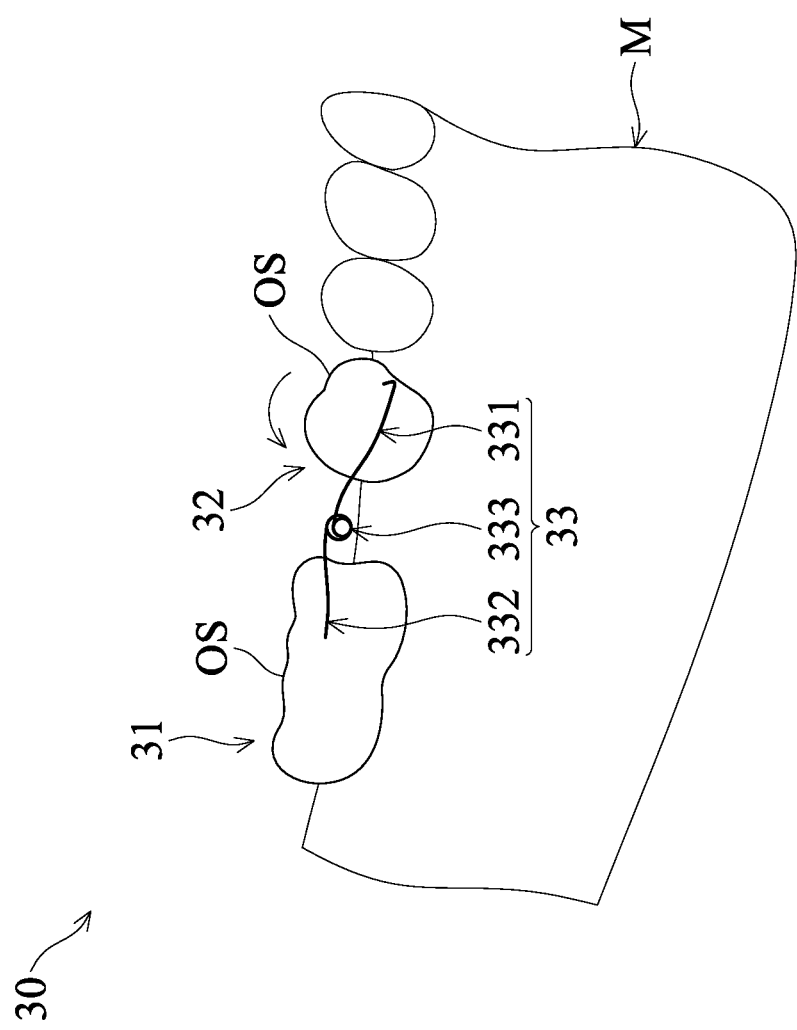
FIG. 11 is a schematic side view of the removable orthodontic device in FIG. 10.

FIG. 10 is a schematic view showing another removable orthodontic device 30 in accordance with some embodiments being worn on a dental arch of a patient, when viewed from the occlusal surface of the device. FIG. 11 is a schematic side view of the removable orthodontic device 30 in FIG. 10. In some embodiments, as shown in FIGS. 10 and 11, the removable orthodontic device 30 includes an anchorage cap segment 31 and a moving cap segment 32. The moving cap segment 32 is configured to be removably worn on a tooth (depicted by dashed lines) on one side of a dental arch M that is tipped (or rotated) in the mesial direction. The moving cap segment 32 may be shaped to enclose and cover the tipped tooth (for illustration, also called the second tooth). The anchorage cap segment 31 is configured to be removably worn on a plurality of teeth (depicted by dashed lines) (for illustration, also called the first teeth) adjacent to the tipped (or second) tooth and on the same side of the dental arch M, and act as an anchorage for an orthodontic wire structure to exert an elastic correction force on the tipped tooth inside the moving cap segment 32 (which will be illustrated further later). The anchorage cap segment 31 may be shaped to enclose and cover the first teeth. The structures and materials of the anchorage cap segment 31 and moving cap segment 32 may be similar to those of the anchorage cap segment 111 and moving cap segments 121 described above, and thus are not repeated herein.

As shown in FIGS. 10 and 11, the removable orthodontic device 30 further includes an orthodontic wire structure 33. The orthodontic wire structure 33 can be made of shape memory alloys (SMA) and may have a U-shaped portion 331, two rod portions 332, 332, and two loop spring portions 333, 333 disposed between both ends of the U-shaped portion 331 and the two rod portions 332, 332.

The U-shaped portion 331 can be fixed embedded in and disposed around the buccal sidewall 32B, lingual sidewall 32C and an interproximal sidewall 32D (connected between the buccal and lingual sidewalls 32B and 32C and located near the front side of the dental arch M) of the moving cap segment 32. The manner in which the U-shaped portion 331 is integrated with the moving cap segment 32 is similar to that of the moving cap segment 121 described above, and thus is not repeated herein. The two rod portions can be fixedly embedded in the buccal sidewall 31B and lingual sidewall 31C of the anchorage cap segment 31. The manner in which the two rod portions 332, 322 are integrated with the anchorage cap segment 31 is similar to that of the anchorage cap segment 111 described above (see FIG. 3), but the sectional size (i.e., diameter) of each channel formed in the anchorage cap segment 31 matches the sectional size (i.e., diameter) of the rod portion 332 so that the two rod portions 332, 322 is fixedly embedded in the anchorage cap segment 31. The two loop spring portions 333, 333 are configured between the moving cap segment 32 and the anchorage cap segment 31 to generate an elastic resilient force (when they try to return to their original un-deformed shapes) to move the moving cap segment 32 relative to the anchorage cap segment 31, as indicated by the arrow in FIG. 11. Accordingly, it can upright the tipped (or second) tooth.

It should be appreciated that many variations and modifications can be made to the removable orthodontic devices described above. For example, the number and the installation location of the anchorage cap segments, moving cap segments, spring elements, guiding wires, and/or orthodontic wire structure can also vary according to the actual requirements, and are not limited to the above illustrative embodiments.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A removable orthodontic device, comprising:
   an anchorage cap segment configured to be removably worn on anterior teeth of a dental arch of a patient;
   a moving cap segment configured to be removably worn at least one posterior tooth on a side of the dental arch;
   a pair of spring elements disposed between the anchorage cap segment and the moving cap segment adapted to be disposed on buccal and lingual sides of the side of the dental arch to generate an elastic resilient force to move the moving cap segment relative to the anchorage cap segment; and
   a guiding wire having a U-shaped portion and two rod portions extending from both ends of the U-shaped portion, wherein the U-shaped portion is embedded in and disposed around buccal, lingual and distal sidewalls of the moving cap segment, and guiding channels are formed in buccal and lingual sidewalls of the anchorage cap segment for receiving the two rod portions to guide movement of the moving cap segment.

2. The removable orthodontic device as claimed in claim 1, wherein each of the guiding channels extends mesial-distally.

3. The removable orthodontic device as claimed in claim 1, wherein each of the buccal, lingual and distal sidewalls of the moving cap segment has a thickness to accommodate the U-shaped portion of the guiding wire, and each of the buccal and lingual sidewalls of the anchorage cap segment has a thickness to accommodate a tubular guiding channel for receiving one of the two rod portions of the guiding wire.

4. The removable orthodontic device as claimed in claim 1, wherein each of the pair of spring elements is wrapped around the guiding wire.

5. The removable orthodontic device as claimed in claim 1, wherein each of the pair of spring elements is a compression coil spring.

6. The removable orthodontic device as claimed in claim 1, wherein each of the pair of spring elements is an extension coil spring.

7. The removable orthodontic device as claimed in claim 1, wherein a vertical height difference is formed between the guiding wire coupled to the anchorage cap segment and the guiding wire coupled to the moving cap segment.

8. A removable orthodontic device, comprising:
   an anchorage cap segment configured to be removably worn on posterior teeth on a side of a dental arch of a patient;
   a moving cap segment configured to be removably worn on at least one anterior tooth on the side of the dental arch;
   a pair of spring elements disposed between the anchorage cap segment and the moving cap segment adapted to be disposed on buccal and lingual sides of the side of the dental arch to generate an elastic resilient force to move the moving cap segment relative to the anchorage cap segment; and
   a guiding wire having a U-shaped portion and two rod portions extending from both ends of the U-shaped portion, wherein the U-shaped portion is embedded in and disposed around the buccal, lingual and mesial sidewalls of the moving cap segment, and guiding channels are formed in buccal and lingual sidewalls of the anchorage cap segment for receiving the two rod portions to guide the movement of the moving cap segment.

9. The removable orthodontic device as claimed in claim 8, wherein each of the guiding channels extends mesial-distally.

10. The removable orthodontic device as claimed in claim 8, wherein each of the buccal, lingual and mesial sidewalls of the moving cap segment has a thickness to accommodate the U-shaped portion of the guiding wire, and each of the buccal and lingual sidewalls of the anchorage cap segment has a thickness to accommodate a tubular guiding channel for receiving one of the two rod portions of the guiding wire.

11. The removable orthodontic device as claimed in claim 8, wherein each of the pair of spring elements is directly connected to the anchorage cap segment and the moving cap segment without coupling to the guiding wire.

12. The removable orthodontic device as claimed in claim 8, wherein each of the pair of spring elements is an extension coil spring.

13. The removable orthodontic device as claimed in claim 8, comprising:
   a plurality of anchorage cap segments configured to be removably worn on posterior teeth on two sides of the dental arch, respectively;
   a plurality of moving cap segments configured to be removably worn on at least one anterior tooth on the two sides of the dental arch, respectively;
   multiple pairs of spring elements, wherein each pair of spring elements is disposed between the anchorage cap segment and the moving cap segment adapted to be disposed on buccal and lingual sides of a side of the dental arch to generate an elastic resilient force to move the moving cap segment relative to the anchorage cap segment; and
   a plurality of guiding wires each having a U-shaped portion and two rod portions extending from both ends of the U-shaped portion, wherein the U-shaped portion is embedded in and disposed around the buccal, lingual and mesial sidewalls of the moving cap segment, and guiding channels are formed in the buccal and lingual sidewalls of the anchorage cap segment for receiving the two rod portions to guide movement of the moving cap segment.

14. The removable orthodontic device as claimed in claim 13, further comprising a transverse bar connecting the anchorage cap segments and having a shape conforming to a palate or a floor of a mouth of the patient.

15. The removable orthodontic device as claimed in claim 8, wherein the anchorage cap segment further has a vertical extension part extended from the buccal sidewall of the anchorage cap segment and a first connector formed on the vertical extension part, the moving cap segment further has a second connector formed on the buccal sidewall of the moving cap segment, and the removable orthodontic device further comprises an elastic member coupling the second connector to the first connector to exert an elastic traction force having horizontal and vertical components on the moving cap segment.

16. A removable orthodontic device, comprising:
   an anchorage cap segment configured to be removably worn on a plurality of first teeth on a side of a dental arch of a patient;
   a moving cap segment configured to be removably worn on a second tooth on the side of the dental arch; and
   a wire structure having a U-shaped portion, two rod portions, and two loop spring portions disposed between both ends of the U-shaped portion and the two rod portions, wherein the U-shaped portion is embedded in and disposed around a buccal sidewall of the moving cap segment, a lingual sidewall of the moving cap segment, and an interproximal sidewall between the buccal and lingual sidewalls of the moving cap segment, the two rod portions are embedded in the buccal and lingual sidewalls of the anchorage cap segment, and the two loop spring portions are configured between the moving cap segment and the anchorage cap segment to generate an elastic resilient force to move the moving cap segment relative to the anchorage cap segment.

17. The removable orthodontic device as claimed in claim 16, wherein each of the buccal, lingual and interproximal sidewalls of the moving cap segment has a thickness to accommodate the U-shaped portion of the wire structure, and each of the buccal and lingual sidewalls of the anchorage cap segment has a thickness to accommodate one of the two rod portions of the wire structure.

* * * * *